(12) United States Patent
Nijland

(10) Patent No.: US 9,849,644 B2
(45) Date of Patent: Dec. 26, 2017

(54) DEVICE AND METHOD FOR BUTT-SPLICING STRIP MEMBERS

(71) Applicant: VMI HOLLAND B.V., Epe (NL)

(72) Inventor: Gerrit Roy Nijland, Holten (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 15/507,138

(22) PCT Filed: Jun. 30, 2015

(86) PCT No.: PCT/NL2015/050480
§ 371 (c)(1),
(2) Date: Feb. 27, 2017

(87) PCT Pub. No.: WO2016/032322
PCT Pub. Date: Mar. 3, 2016

(65) Prior Publication Data
US 2017/0239901 A1    Aug. 24, 2017

(30) Foreign Application Priority Data
Aug. 29, 2014   (NL) ..................................... 2013391

(51) Int. Cl.
*B29D 30/42* (2006.01)
*F16G 3/10* (2006.01)
(Continued)

(52) U.S. Cl.
CPC .............. *B29D 30/42* (2013.01); *B29C 65/02* (2013.01); *B29C 65/7802* (2013.01);
(Continued)

(58) Field of Classification Search
CPC ........ B29D 2030/422; B29D 2030/426; F16G 3/003; F16G 3/10; F16G 3/16; B29C 66/435; B29C 66/834
See application file for complete search history.

(56) References Cited

U.S. PATENT DOCUMENTS

| 4,765,862 A | 8/1988 | Azuma | 156/507 |
|---|---|---|---|
| 6,893,531 B1 * | 5/2005 | Todaro | B65H 21/00 156/304.1 |

(Continued)

FOREIGN PATENT DOCUMENTS

| DE | 2359131 | 6/1975 | ............. B29C 65/00 |
|---|---|---|---|
| EP | 1658952 | 5/2006 | ............. B29C 65/00 |

(Continued)

OTHER PUBLICATIONS

International Search Report and Written Opinion issued in application No. PCT/NL2015/050480, dated Oct. 6, 2015 (11 pgs).

(Continued)

*Primary Examiner* — Mark A Osele
(74) *Attorney, Agent, or Firm* — Hayes Soloway P.C.

(57) ABSTRACT

Provided is a device and method for butt-splicing strip members for tire components, having a first clamp and a second clamp arranged for clamping a first end of a first strip member and a second end of a second strip member, respectively, wherein at least one of the first clamp and the second clamp is movable along a butt-splice direction into a butt-splicing position opposite to the other of the first clamp and the second clamp for butt-splicing the ends, wherein the first clamp includes a first upper clamp member and a first lower clamp member, wherein the second clamp includes a second upper clamp member and a second lower clamp member, wherein the first lower clamp member projects beyond the first upper clamp member over a first overlap distance and wherein the second upper clamp member projects beyond the second lower clamp member over a second overlap distance.

21 Claims, 11 Drawing Sheets

(51) Int. Cl.
  *F16G 3/00* (2006.01)
  *B29C 65/78* (2006.01)
  *B29C 65/02* (2006.01)
  *F16G 3/16* (2006.01)
  *B29C 65/00* (2006.01)
  *B29L 30/00* (2006.01)

(52) U.S. Cl.
  CPC .... *B29C 65/7841* (2013.01); *B29C 66/02241* (2013.01); *B29C 66/1122* (2013.01); *B29C 66/1142* (2013.01); *B29C 66/232* (2013.01); *B29C 66/43* (2013.01); *B29C 66/723* (2013.01); *B29C 66/81427* (2013.01); *B29C 66/81431* (2013.01); *B29C 66/8322* (2013.01); *B29C 66/8432* (2013.01); *F16G 3/003* (2013.01); *F16G 3/10* (2013.01); *B29C 66/435* (2013.01); *B29C 66/834* (2013.01); *B29C 66/83221* (2013.01); *B29C 2793/0081* (2013.01); *B29D 2030/422* (2013.01); *B29D 2030/426* (2013.01); *B29L 2030/00* (2013.01); *F16G 3/16* (2013.01)

(56) References Cited

U.S. PATENT DOCUMENTS

| | | | |
|---|---|---|---|
| 9,188,192 B2* | 11/2015 | Cancienne, Jr. | F16G 3/006 |
| 9,486,971 B2* | 11/2016 | Zieger | B29C 65/782 |
| 2004/0118513 A1* | 6/2004 | Dyrlund | B29C 66/1142 |
| | | | 156/304.1 |
| 2006/0272780 A1 | 12/2006 | Takagi | 156/502 |
| 2008/0223507 A1 | 9/2008 | Takagi | 156/117 |
| 2011/0067801 A1* | 3/2011 | van 't Schip | B29C 65/1412 |
| | | | 156/157 |

FOREIGN PATENT DOCUMENTS

| | | | |
|---|---|---|---|
| GB | 528264 | 10/1940 | |
| KR | 20060055387 | 5/2006 | ............. B29D 30/08 |

OTHER PUBLICATIONS

International Preliminary Report on Patentability issued in application No. PCT/NL2015/050480, dated Feb. 28, 2017 (7 pgs).

\* cited by examiner

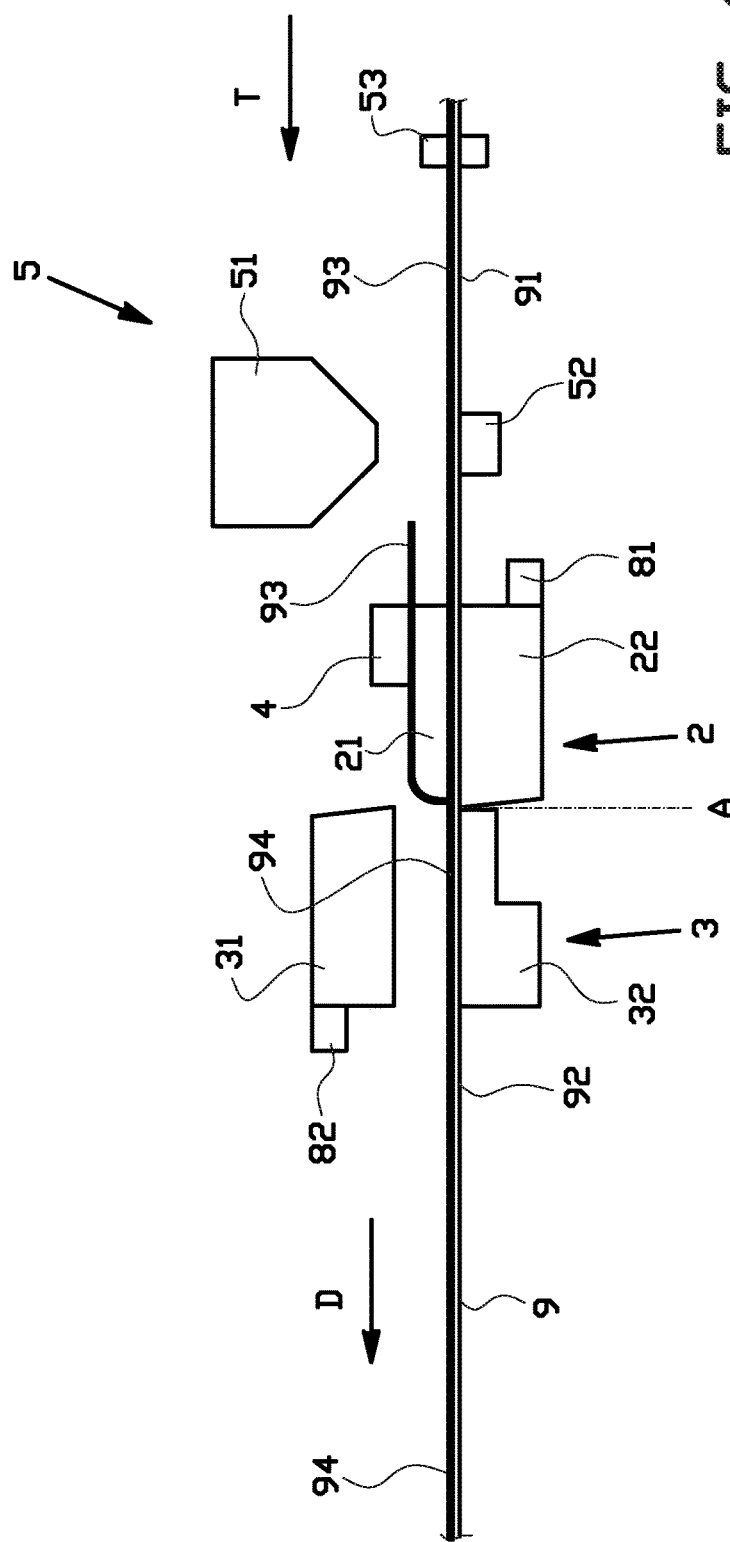

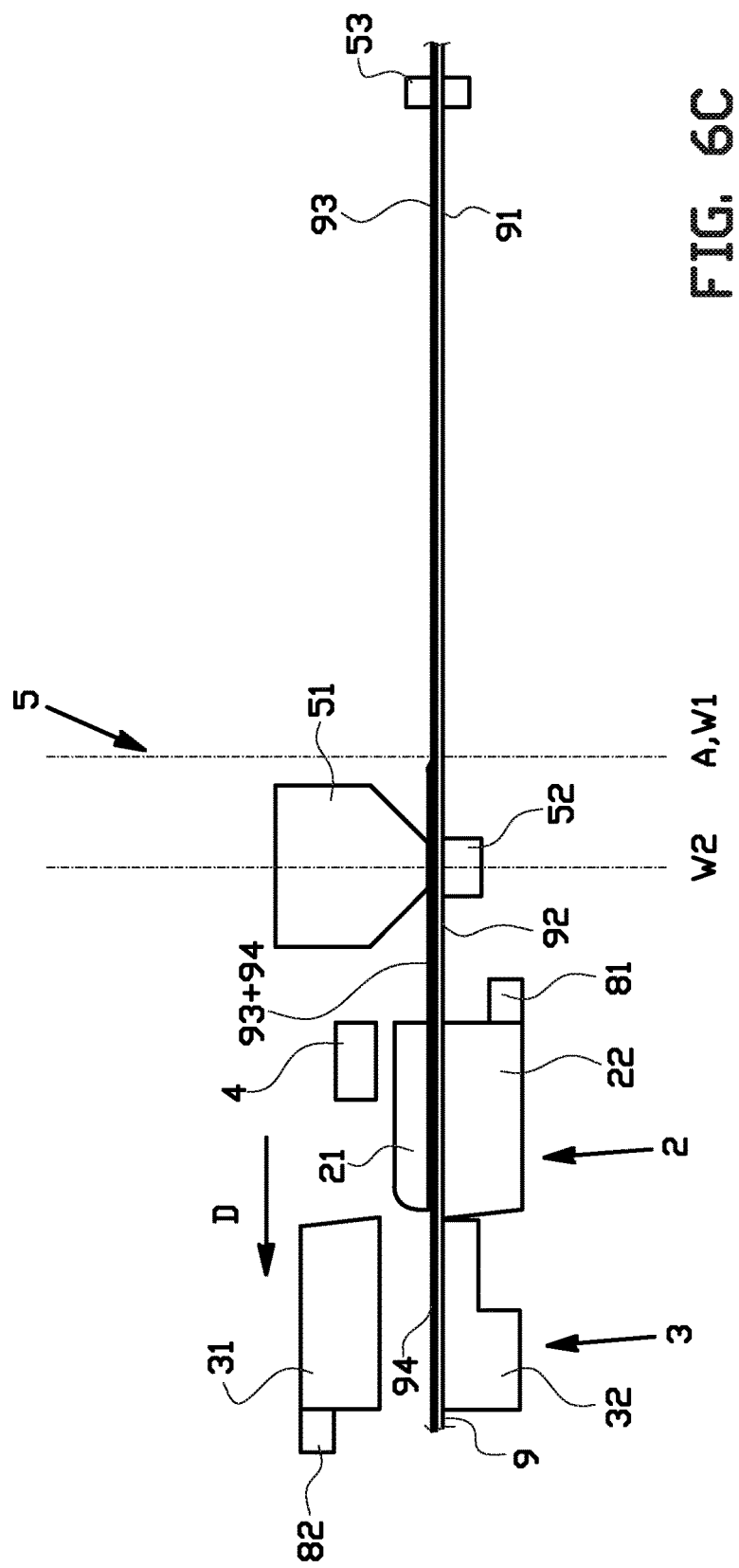

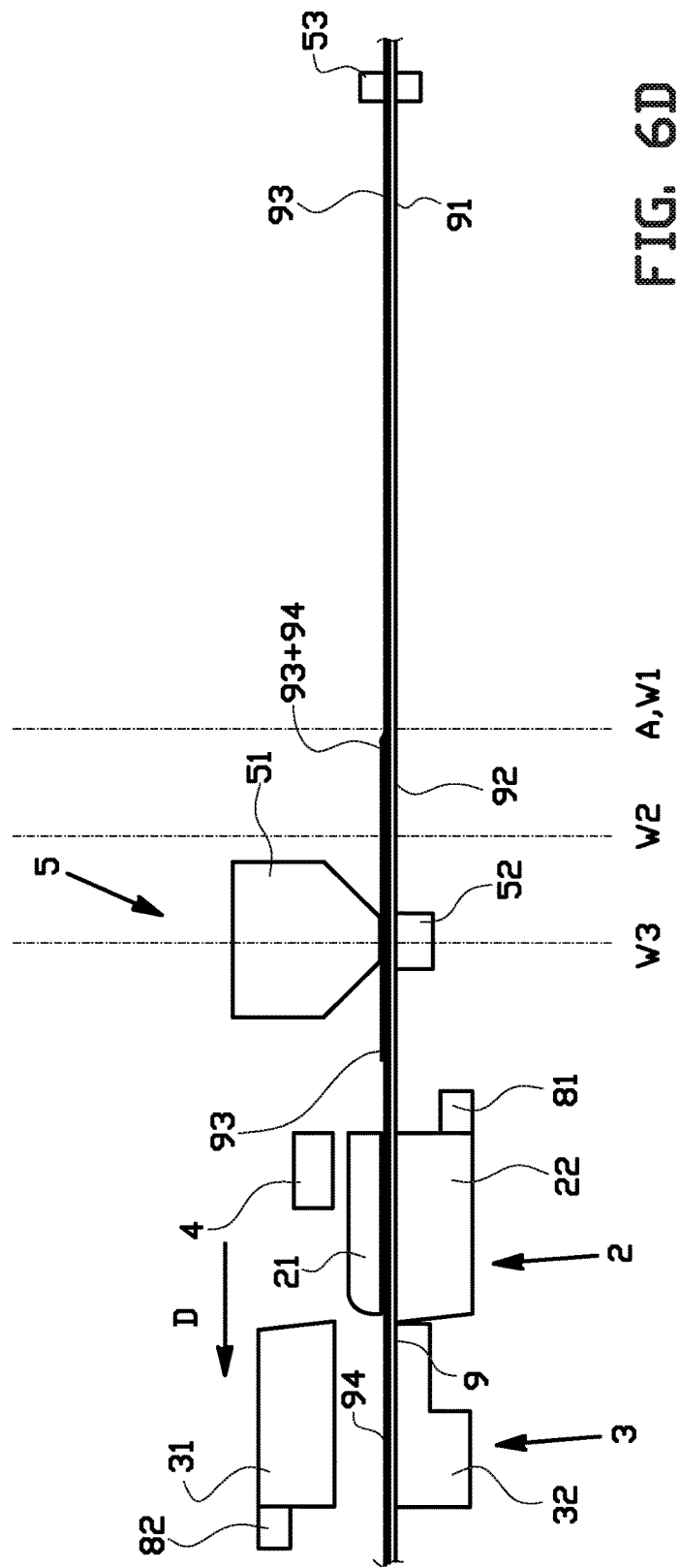

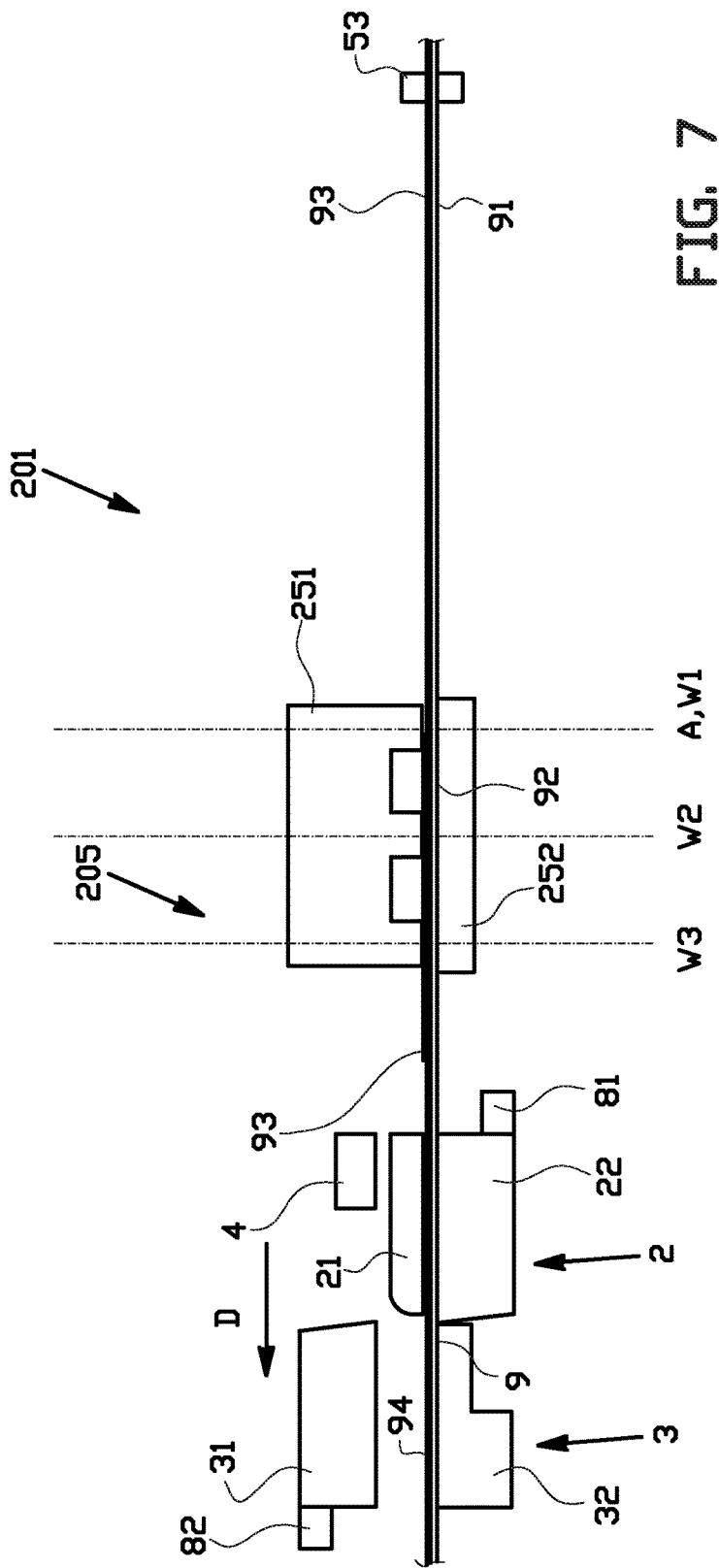

DEVICE AND METHOD FOR BUTT-SPLICING STRIP MEMBERS

BACKGROUND

The invention relates to a device and method for butt-splicing strip members for a tire.

EP 1 658 952 A1 discloses a device for butt-splicing of two cord band portions for tires. The device is provided with two opposite splicing bars. Each splicing bar comprises clamp ridges and upper and lower teeth extending over an equal distance from the clamp ridges towards respective upper and lower teeth of the opposite splicing bar. The teeth of the splicing bars are arranged to intermesh, wherein the teeth partially overlap the teeth of the opposite splicing bar. Because of the overlap, a better compression at the butt-splice position can be effectuated. The teeth meanwhile prevent thickening of the material of the cord bands during butt-splicing.

The teeth are not arranged for clamping the cord band portions. The cord band portions are thus only clamped at a considerable distance from the butt-splice position. The position of the cord band portions at the butt-splice position is therefore unknown and possibly inaccurate. Furthermore, the teeth of the splicing bars may leave imprints on the material of the cord band portions. Finally, the teeth may interfere with other operations to be performed on the cord band portions.

It is an object of the present invention to provide a device and method for butt-splicing strip members for a tire, wherein at least one of the aforementioned drawbacks can be at least partially reduced.

SUMMARY OF THE INVENTION

According to a first aspect, the invention provides a device for butt-splicing strip members for tire components, comprising a first clamp and a second clamp arranged for clamping a first end of a first strip member and a second end of a second strip member, respectively, wherein at least one of the first clamp and the second clamp is movable along a butt-splice direction into a butt-splicing position opposite to the other of the first clamp and the second clamp for butt-splicing the first end of the first strip member and the second end of the second strip member in the butt-splice direction, wherein the first clamp comprises a first upper clamp member and a first lower clamp member for in cooperation clamping the first end, wherein the second clamp comprises a second upper clamp member and a second lower clamp member for in cooperation clamping the second end, wherein the first lower clamp member projects beyond the first upper clamp member in the butt-splice direction towards the second clamp over a first overlap distance and wherein the second upper clamp member projects beyond the second lower clamp member in the butt-splice direction towards the first clamp over a second overlap distance.

Because the first lower clamp member and the second upper clamp member project beyond the first upper clamp member and the second lower clamp member, they can be moved into mutual overlap at the butt-splice position. The overlap can decrease the unclamped length of first strip member and the second strip member at the butt-splice position, thereby increasing the accuracy of the positioning of the first end and the second end during butt-splicing. The overlap can further increase the amount of compression that can be achieved between the first end and the second end at the butt-splice position for tightly butt-splicing said ends.

In an embodiment the smallest of the first overlap distance and the second overlap distance is at least one millimeter, and preferably at least three millimeters. The smallest of the two overlap distances can determine the maximum amount of mutual overlap that can be achieved between the first lower clamp member and the second upper clamp member, and thus the amount of compression that can be achieved between the first end and the second end of the strip members.

In an embodiment the first lower clamp member is arranged for fully supporting the first end of the first strip member. Thus, the accuracy of the positioning of the first end of the first strip member can be improved during both cutting and butt-splicing. In particular, the first strip member can be fully supported up to the butt-splice position.

In an embodiment the first lower clamp member is provided with a lower cutting edge, wherein the device further comprises a first knife that is arranged for cutting the first end of the first strip member along and in cooperation with the lower cutting edge. The first end can thus be cut along the first lower clamp member, which first lower clamp member is also subsequently used to butt-splice the cut first end.

In an embodiment the first knife is an upper knife that is movable in a first cutting direction transverse or perpendicular to the butt-splice direction along the lower cutting edge. The first knife and the first lower clamp member can thus acts as a knife and bar cutter, using the first lower clamp member to support the first end of the first strip member against the cutting force of the first knife.

In an embodiment the lower cutting edge, preferably the entire lower cutting edge, projects beyond the first upper clamp member in the butt-splice direction towards the second clamp over the first overlap distance. Thus, the first knife can be moved along the lower cutting edge in the first cutting direction without interference of the first upper clamp member.

In an embodiment the first knife is arranged to be retracted into a first waiting position in which the first knife out of the way of the first clamp when moving in the butt-splice direction. The first knife can thus be positioned in the first waiting position out of the path of movement of the first clamp when moving in the butt-splice direction, yet ready quickly to cut a subsequent first end of a subsequent first strip member.

In an embodiment the second upper clamp member is provided with an upper cutting edge, wherein the device further comprises a second knife that is arranged for cutting the second end of the second strip member along and in cooperation with the upper cutting edge. The second end can thus be cut along the second upper clamp member, which second upper clamp member is also subsequently used to butt-splice the cut second end.

In an embodiment the second knife is a lower knife that is movable in a second cutting direction transverse or perpendicular to the butt-splice direction along the upper cutting edge. The second knife and the second upper clamp member can thus acts as a knife and bar cutter, using the second upper clamp member to support the second end of the second strip member against the cutting force of the second knife.

In an embodiment the upper cutting edge, preferably the entire upper cutting edge, projects beyond the second lower clamp member in the butt-splice direction towards the first clamp over the second overlap distance. Thus, the second knife can be moved along the upper cutting edge in the second cutting direction without interference of the second lower clamp member.

In an embodiment the first strip member and the second strip member are provided with a first liner and a second liner, respectively, wherein the first liner is arranged to be peeled off from the first end prior to butt-splicing and to be applied on top the second liner at the second strip member after butt-splicing, wherein the device further comprises a sealer for welding the first liner to the second liner at the second strip member at or near the butt-spliced ends thereof after butt-splicing. After welding, the first liner and the second liner can form a substantially continuous liner over the butt-splice that has just been created between the first end and the second end.

In an embodiment the device is provided with a first drive for driving the first clamp towards the second clamp. Alternatively or in addition, the device is provided with a second drive for driving the second clamp towards the first clamp. Thus, either one of the clamps or both clamps can be driven towards each other into the butt-splice position.

In an embodiment the first end is the leading end of the first strip member and the second end is the trailing end of the second strip member. As the first strip member and the second strip member are arranged to be transported in a transport direction, the first clamp is preferably located upstream of the second clamp in the transport direction.

In a reversed or mirrored embodiment the first end is the trailing of the second strip member and the second end is the leading end of the first strip member. As the first strip member and the second strip member are arranged to be transported in a transport direction, the first clamp is preferably located downstream of the second clamp in the transport direction.

According to a second aspect, the invention provides a method for butt-splicing strip members for tire components with the use of the device according to any one of the preceding claims, wherein the method comprises the step of moving the first clamp and/or the second clamp into the butt-splice position such that the first lower clamp member and the second upper clamp member, respectively, are in mutual overlap in the butt-splice direction.

Because the first lower clamp member and the second upper clamp member project beyond the first upper clamp member and the second lower clamp member, they can be moved into mutual overlap at the butt-splice position. The overlap can decrease the unclamped length of first strip member and the second strip member at the butt-splice position, thereby increasing the accuracy of the positioning of the first end and the second end during butt-splicing. The overlap can further increase the amount of compression that can be achieved between the first end and the second end at the butt-splice position for tightly butt-splicing said ends.

In an embodiment thereof the method further comprises the steps of peeling of the first liner from the first end prior to butt-splicing, applying the first liner on top of the second liner after butt-splicing and welding the first liner to the second liner at the second strip member at or near the butt-spliced ends thereof after butt-splicing. After welding, the first liner and the second liner can form a substantially continuous liner over the butt-splice that has just been created between the first end and the second end.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which:

FIGS. 6A, 6B, 6C and 6D show further steps of the method according to FIGS. 4A-4C; and FIG. 7 show a further alternative device with an alternative sealer for alternatively performing the steps as shown in FIGS. 6A-D.

DETAILED DESCRIPTION OF THE INVENTION

Figure 1:
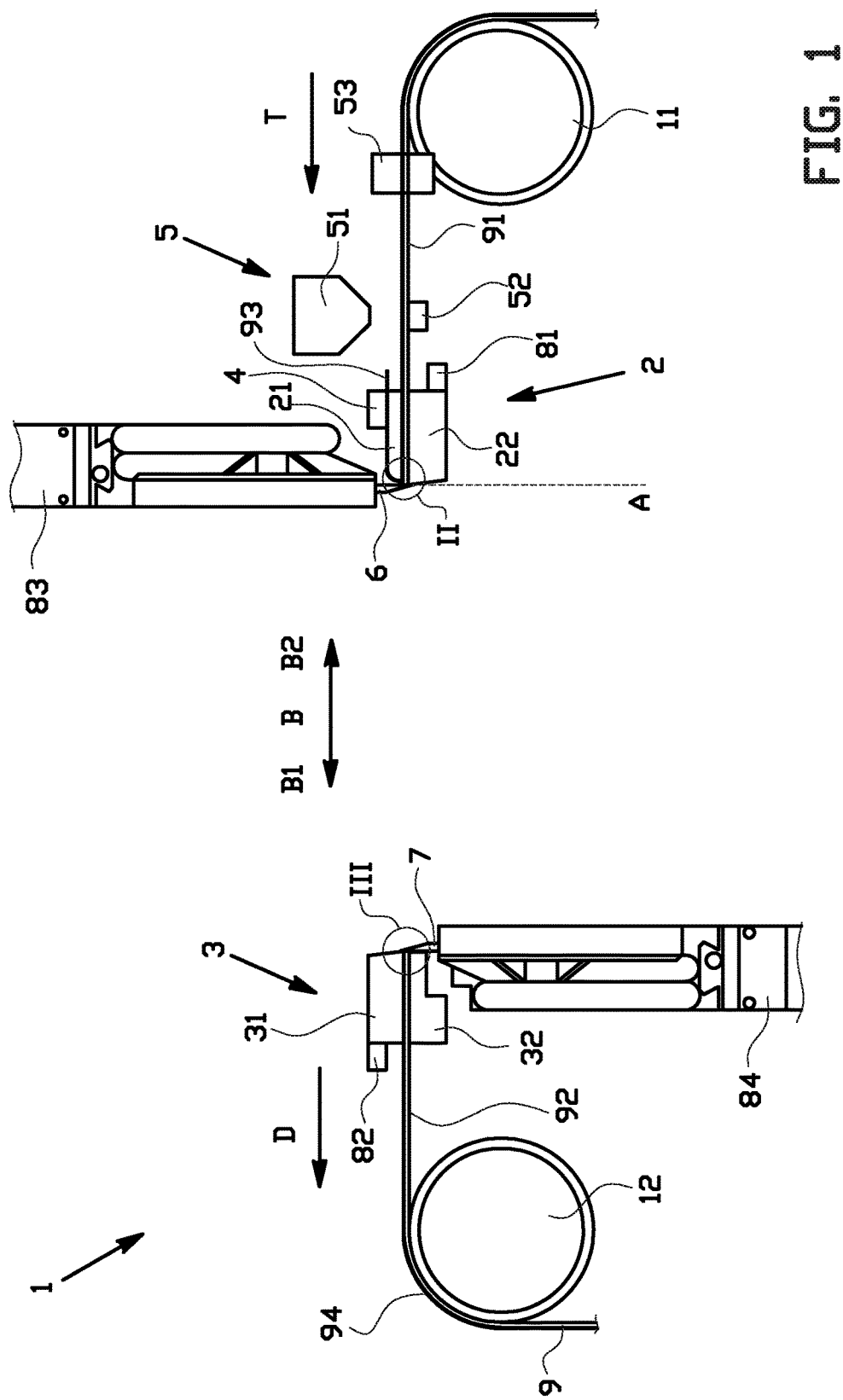
FIG. 1 shows an overview of a device for butt-splicing strip members for tire components, according to a first embodiment of the invention.

FIG. 1 shows a butt-splicing device 1 according to an exemplary first embodiment of the invention for butt-splicing a leading end LE of a first strip member 91 to the trailing end TE of a second strip member 92, for forming a continuous, butt-spliced strip 9, preferably a gum strip, for use in a subsequent tire building stage of tires and/or tire components thereof (not shown). Both the first strip member 91 and the second strip member 92 are covered at their upper side by a first liner 93 and a second liner 94, respectively.

The first strip member 91 is supplied from a stock roll via roll 11 in a transport direction T into the device 1 towards a butt-splice position A. The second strip member 92 is a previously processed first strip member 91 which has already been spliced to a previously prepared second strip member 92 to form the butt-spliced strip 9. The device 1 comprises a driven roller 12 for discharge of the butt-spliced strip 9, in a discharge direction D towards the subsequent tire building stage, e.g. into a festooner or for direct application onto a building drum (not shown). The device 1 further comprises a first clamp 2 for clamping the leading end LE of the first strip member 91, a second clamp 3, downstream of the first clamp 2 in the transport direction T, for clamping the trailing end TE of the second strip member 92 and a third clamp 4 for clamping the first liner 93 at the first strip member 91.

The device 1 also comprises a sealer 5 for welding or sealing the first liner 93 to the butt-spliced strip 9. The sealer 5 comprises a welding head 51 and a counterpart for said welding head 51. Optionally, the sealer 5 comprises a fourth clamp 53 to clamp and fixate the first strip member 91 in the transport direction T during handling and/or welding of the first liner 93 on top of said second liner 94.

The first clamp 2 and the second clamp 3 are movable in opposite directions B1, B2 along a butt-splice direction B, parallel to the transport direction T, towards the butt-splice position A. At or near the butt-splice position A, the first clamp 2 and the second clamp 3 are arranged to be opposite to each other in said butt-splice direction B, in a manner which will be described in more detail hereafter.

As further shown in FIG. 1, the device 1 is provided with a first upper knife 6 and a second lower knife 7 for cutting the leading end LE of the first strip member 91 and the trailing end TE of the second strip member 92, respectively.

Figure 2:
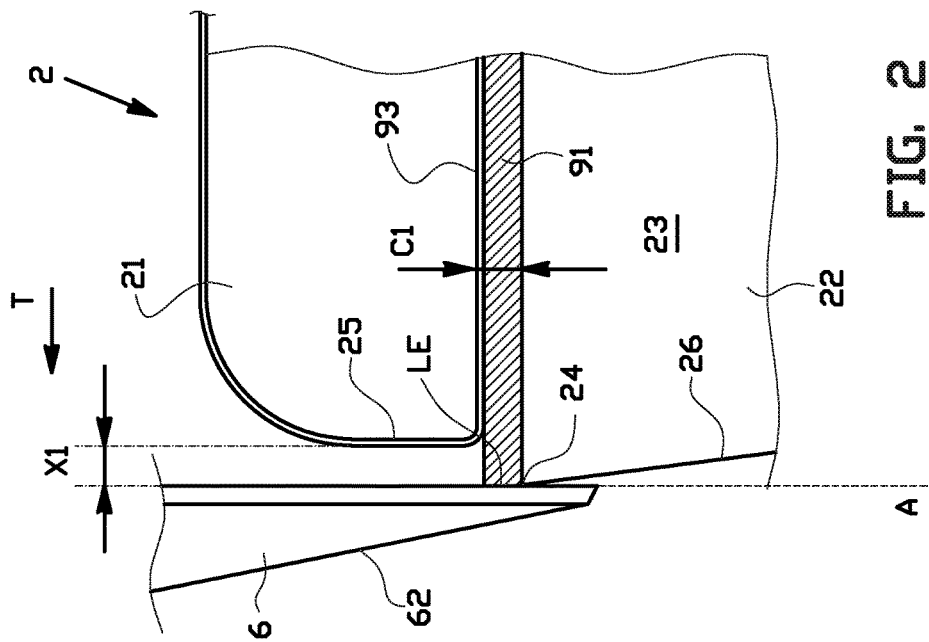
FIGS. 2 and 3 show details of the device according to the circles II and III in FIG. 1.

As shown in more detail in FIG. 2, the first clamp 2 comprises a first upper clamp member 21 and a first lower clamp member 22 which are movable in a first clamping direction C1 for securely clamping the leading end LE of the first strip member 91 in between. The first lower clamp member 22 projects beyond the first upper clamp member 21 in or substantially parallel to the butt-splice direction B in a direction B1 towards the second clamp 3 over a first overlap distance X1. Similarly, the first upper clamp member 21 is recessed, preferably in its entirety, with respect to the first lower clamp member 22 over the first overlap distance X1. The first lower clamp member 22 comprises a bar-like body 23 extending horizontally and transversely or perpendicular to the butt-splice direction B. The bar-like body 23 is provided with a lower cutting edge 24 at the side of the bar-like body 23 facing towards the second clamp 3. The lower cutting edge 24 is arranged for in cooperation with the first upper knife 6 cutting the leading end LE of the first strip member 91. The lower cutting edge 24 at least partially, and preferably entirely, projects beyond the first upper clamp member 21 over the first overlap distance X1. In particular, the lower cutting edge 24 forms the leading edge of the first clamp 2 with respect to the second clamp 3. The lower cutting edge 24 extends linearly in a direction perpendicular to the transport direction T and the first clamping direction C1. The first lower cutting member 24 is arranged to securely fully or completely support the leading end LE of the first strip member 91 up to the lower cutting edge 24. Specifically, the leading end LE is supported consistently over its entire width, perpendicular to the butt-splice direction B.

The first upper clamp member 21 is provided with a first front surface 25 facing towards the second clamp 3, which first front surface 25 extends substantially normal to or perpendicular to the butt-splice direction B. The first lower clamp member 22 is provided with a second front surface 26 facing towards the second clamp 3, which second front surface 26 extends under an inclination with respect to said second clamp 3.

Figure 3:
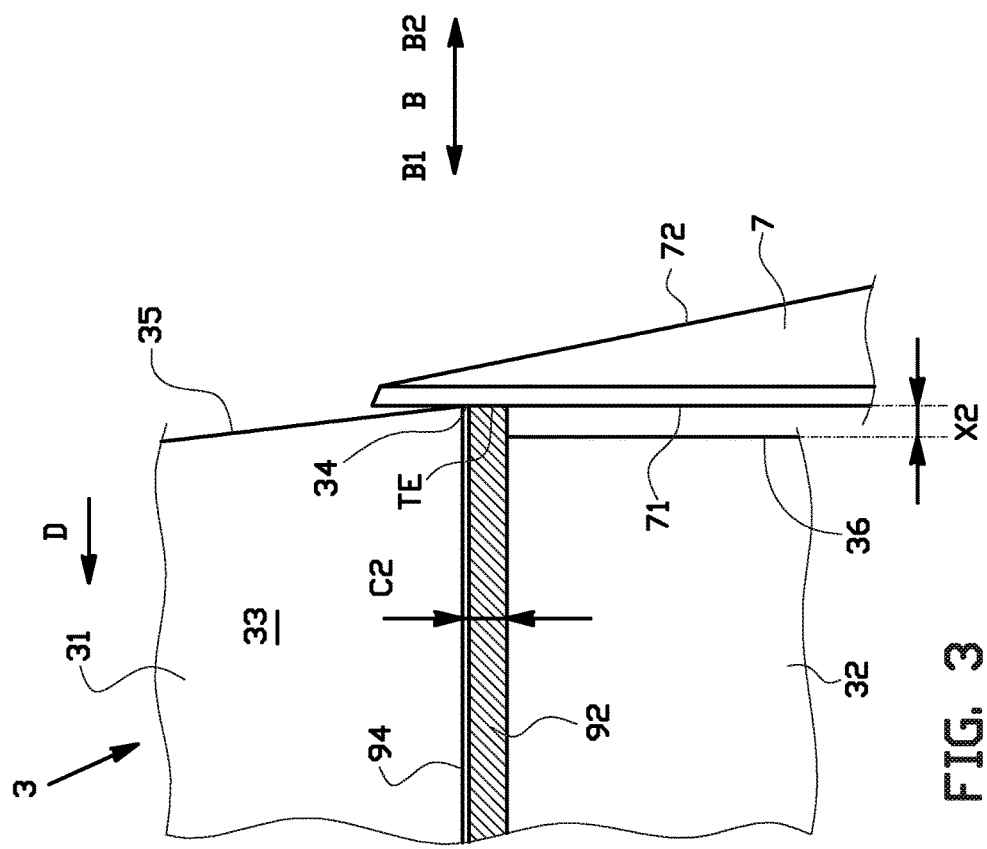

As shown in more detail in FIG. 3, the second clamp 3 comprises a second upper clamp member 31 and a second lower clamp member 32 which are movable in a second clamping direction C2 for securely clamping the trailing end TE of the second strip member 92 in between. The second upper clamp member 31 projects beyond the second lower clamp member 32 in or substantially parallel to the butt-splice direction B in a direction B2 towards the first clamp 2 over a second overlap distance X2. Similarly, the second lower clamp member 32 is recessed, preferably in its entirety, with respect to the second upper clamp member 31 over the second overlap distance X2. In this example, the second overlap distance X2 is smaller than the first overlap distance X1, and is preferably at least one millimeter, more preferably at least three millimeters and most preferably in the range of one to five millimeters. The second upper clamp member 31 comprises a bar-like body 33 extending horizontally and transversely or perpendicular to the butt-splice direction B. The bar-like body 33 is provided with an upper cutting edge 34 at the side of the bar-like body 33 facing towards the first clamp 2. The upper cutting edge 34 is arranged for in cooperation with the second lower knife 7 cutting the trailing end TE of the second strip member 92. The upper cutting edge 34 at least partially, and preferably entirely, projects beyond the second lower clamp member 32 over the second overlap distance X2. In particular, the upper cutting edge 34 forms the leading edge of the second clamp 3 with respect to the first clamp 2. The upper cutting edge 34 extends linearly in a direction perpendicular to the transport direction T and the second clamping direction C2.

The second upper clamp member 31 is provided with a third front surface 35 facing towards the first clamp 2, which third front surface 35 extends under an inclination with respect to said first clamp 2. The second lower clamp member 32 is provided with a fourth front surface 36 facing towards the first clamp 2, which fourth front surface 36 extends substantially normal to or perpendicular to the butt-splice direction B.

As shown in FIG. 1, the device 1 is provided with a first drive 81 for driving the first clamp 2 in the butt-splice direction B in a direction B1 towards and a direction B2 away from the second clamp 3 and a second drive for driving the second clamp 3 in the butt-splice direction B in a direction B2 towards and a direction B1 away from the first clamp 2.

FIG. 1 further shows that the first upper knife 6 is provided with a front cutting surface 61 normal to the butt-splice direction B and a rear surface 62 extending under an inclination with respect to the butt-splice direction B towards the second upper clamp member 31. The device 1 is provided with a third drive 83 for moving the first upper knife 6 in a first cutting direction, transverse or perpendicular to the butt-splice direction B, vertically or horizontally along the lower cutting edge 24. Preferably, the first upper knife 6 is moved horizontally, such that it can be brought into contact with a run-on surface (not shown) of the lower cutting edge 24 before moving along the lower cutting edge 24. Preferably, the first upper knife 6 is biased in the butt splice direction B in a direction B2 towards the first clamp 2. After cutting, the third drive 83 is arranged for retracting the first upper knife 6 into a first waiting position out of the way of the first clamp 2 in the butt-splice direction B or to the side of the first clamp 2.

The device 1 is provided with a fourth drive 84 for moving the second lower knife 7 in a second cutting direction, transverse or perpendicular to the butt-splice direction B, vertically or horizontally along the upper cutting edge 34. Preferably, the second lower knife 7 is moved horizontally, such that it can be brought into contact with a run-on surface (not shown) of the upper cutting edge before moving along the upper cutting edge 34. Preferably, the second lower knife 7 is biased in the butt splice direction B in a direction B1 towards the second clamp 3. After cutting, the fourth drive 84 is arranged for retracting the second upper knife 7 into a second waiting position out of the way of the second clamp 3 in the butt-splice direction B or to the side of the second clamp 3.

In FIG. 1, and more in detail in FIGS. 2 and 3, the step is shown of cutting the leading end LE of the first strip member 91 and the trailing end TE of the second strip member 92 and thereby preparing said ends LE, TE for subsequent butt-splicing. As shown in FIG. 1, the first liner 93 covering the leading end LE of the first strip member 91 is (manually) stripped, pulled or peeled off from said leading end LE to expose the leading end LE. The peeled off portion of the first liner 93 is pulled up, turned up or doubled back around the first front face 25 of the first upper clamp member 21, which is rounded to prevent tearing of the first liner 93 during its pull back. The first liner 93 is temporarily clamped by the liner clamp 4 on top of the first upper clamp member 21. As shown in FIG. 2, the front cutting surface 61 of the first upper knife 6 is moved in the first cutting direction along the lower cutting edge 24 of the first lower clamping member 22 for in cooperation with said lower cutting edge 24 cutting the leading LE of the first strip member 91. As shown in FIG.

3, the front cutting surface 71 of the second lower knife 7 is moved in the second cutting direction along the upper cutting edge 34 of the second upper clamp member 31 for in cooperation with said upper cutting edge 34 cutting the trailing end TE of the second strip member 92. The second liner 94 on top of the second strip member 92 is cut off together with the second strip member 92.

Both leading end LE and trailing end TE are now prepared for the subsequent butt-splicing. In FIGS. 4A-4D, the steps are shown of butt-splicing the leading end LE of the first strip member 91 to the trailing end TE of the second strip member 92.

Figure 4A:
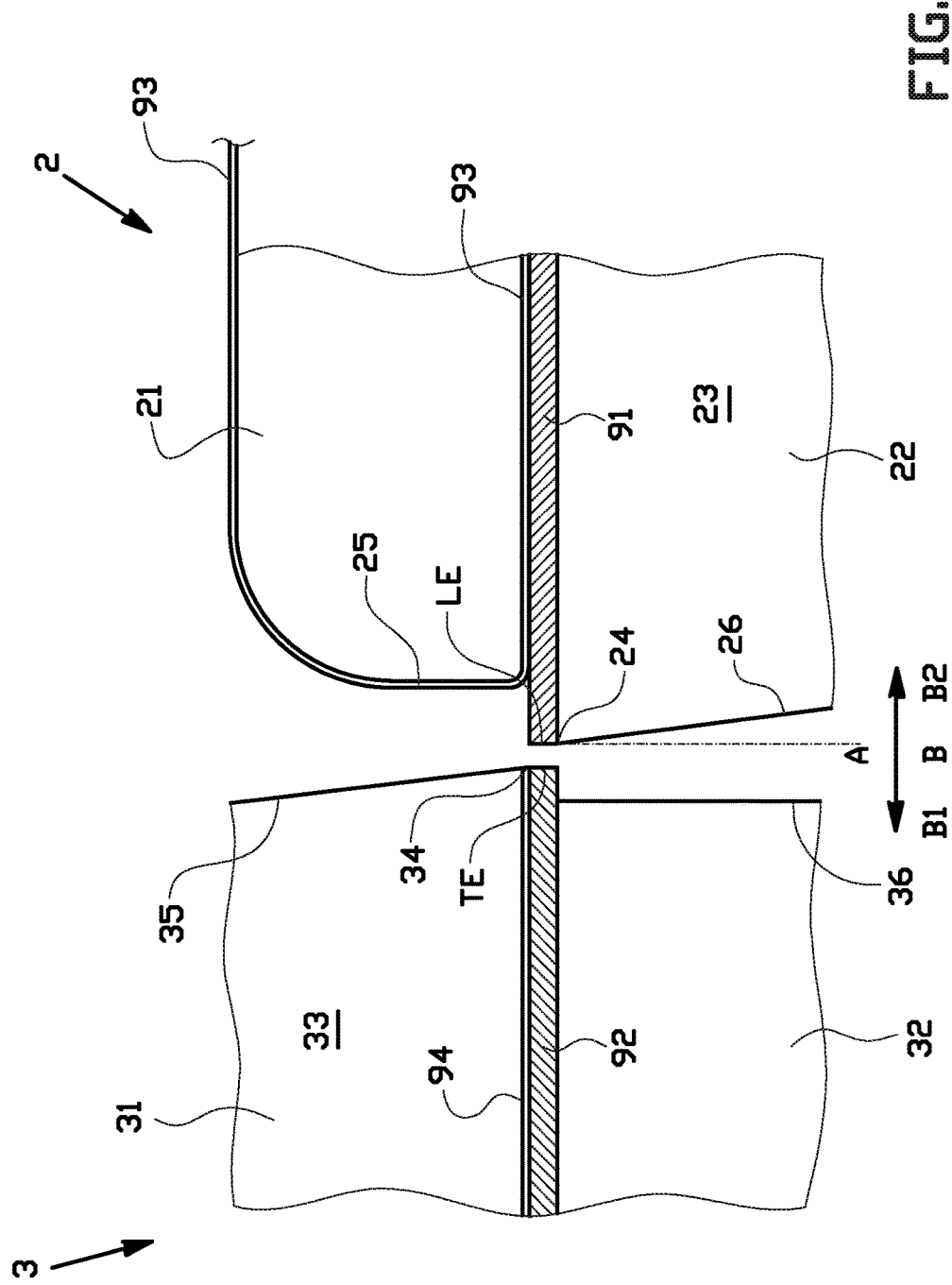
FIGS. 4A, 4B and 4C show subsequent steps of a method for operating the device according to FIG. 1.

In particular, FIG. 4A shows the situation in which the second clamp 3 is moved in a direction B2 in the butt splice direction B towards the first clamp 2 and the butt-splice position A. The trailing end TE and the leading end LE do not yet contact each other.

Figure 4B:
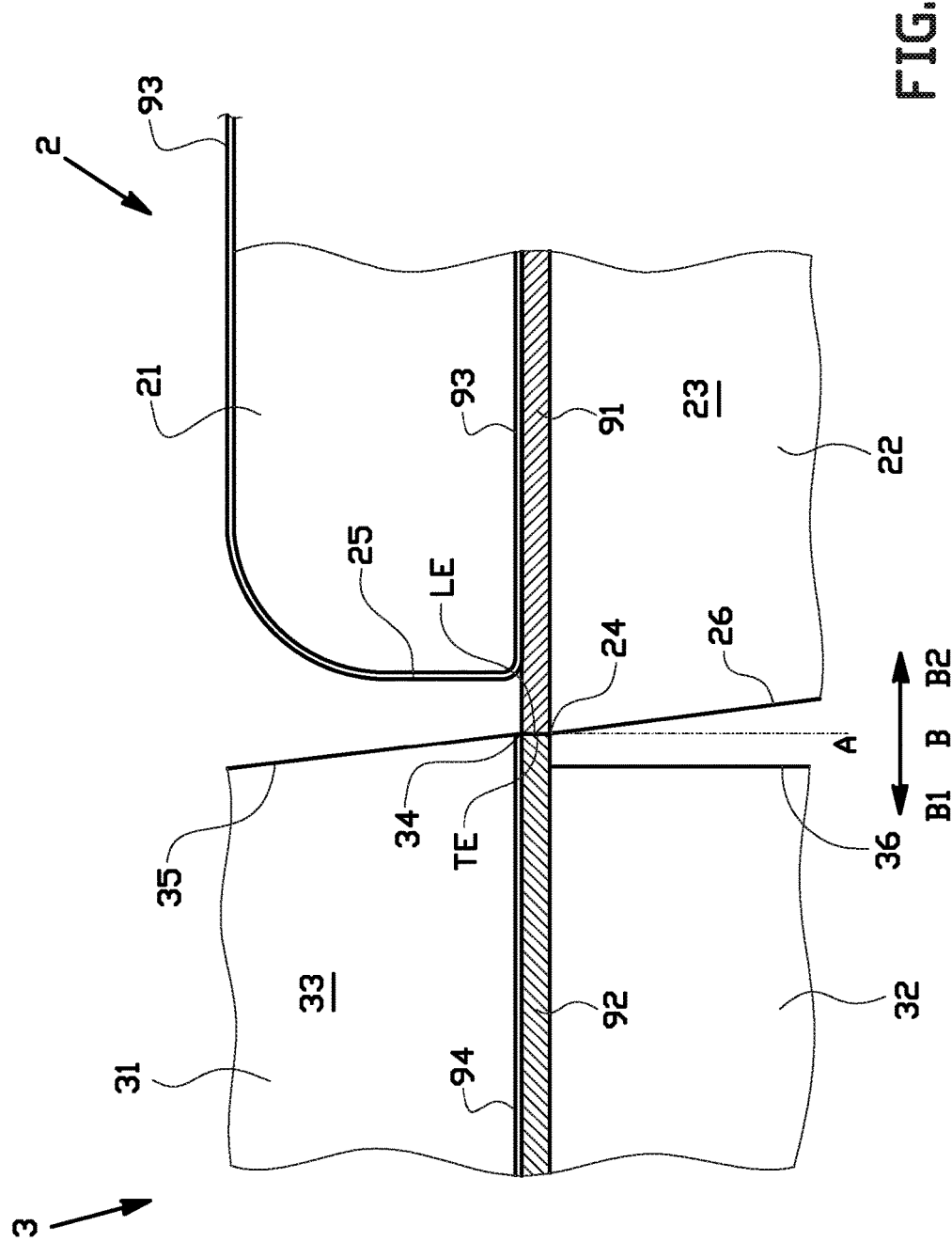

In FIG. 4B, the situation is shown in which the second clamp 3 is moved further in a direction B2 in the butt splice direction B towards the first clamp 2 and the butt-splice position A. The trailing end TE and the leading end LE now contact each other.

Figure 4C:
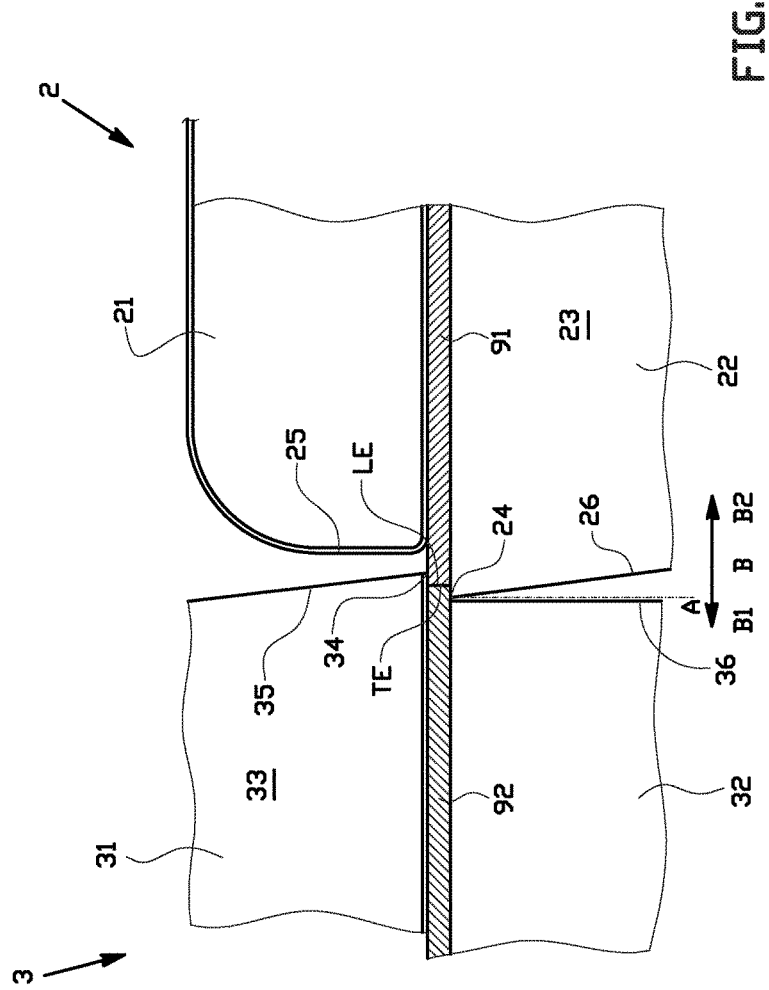

FIG. 4C shows the final step of the butt-splicing operation, in which the second clamp 3 is moved even further in a direction B2 into overlap with the first clamp 2 in the butt splice direction B. The first lower clamp member 22 and the second upper clamp member 31, in the butt-splice position A, are in mutual overlap in the butt-splice direction B, at least by an overlap distance that is equal to the smallest of the two overlap distances X1, X2 defined by the clamps 2, 3. The trailing end TE and the leading end LE now firmly contact each other and are partly compressed for forming a tight butt-splice at the butt-splice position A.

Alternatively, the first clamp 2 can be moved in a direction B1 towards the second clamp 3 in the butt-splice direction B or both of the clamps 2, 3 can be simultaneously moved towards each other in opposite directions B1, B2 along the butt-splice direction B.

Figure 5:
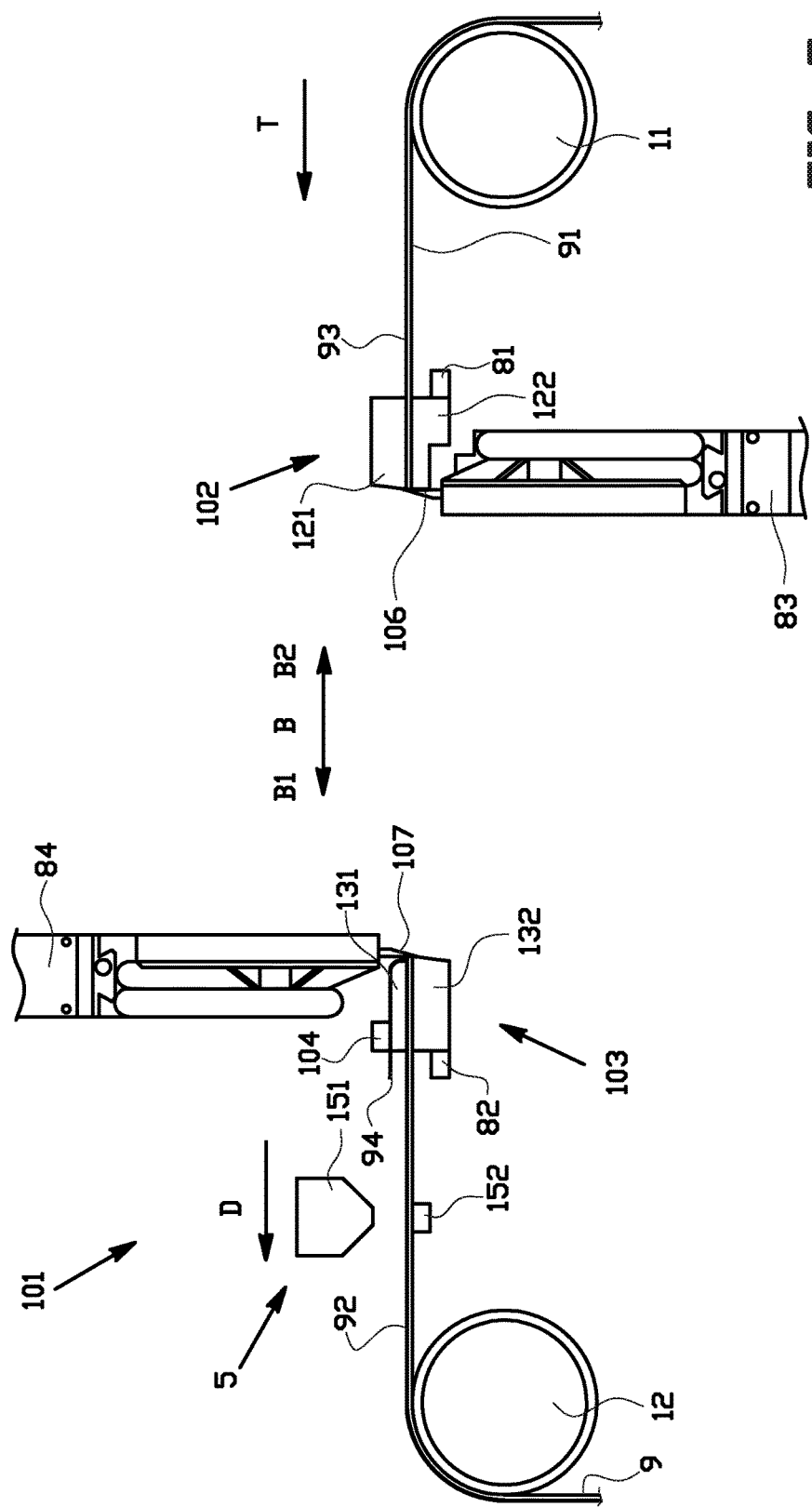
FIG. 5 shows an alternative device for butt-splicing strip members for tire components, according to a second embodiment of the invention.

FIG. 5 shows an alternative device 101 for butt-splicing the aforementioned strip members 91, 92, according to a second embodiment of the invention. The alternative device 101 differs from the device 1 in FIG. 1 in that it comprises an alternative first clamp 102 with an upper clamp member 121 projecting beyond the lower clamp member 122 and in that it comprises an alternative second clamp 103 with a lower clamp member 132 projecting beyond the upper clamp member 131. As such, alternative knifes 106, 107 are provided moving in opposite cutting directions S3, S4 with respect to the knifes 6, 7 in FIG. 1. In essence, the alternative clamps 102, 103 and the respective alternative knifes 106, 107 are thus mirrored in the vertical plane. The alternative clamps 102, 103 and the respective alternative knifes 106, 107 however function in the same manner as the clamps 2, 3 and the knifes 6, 7 in the aforementioned device 1.

FIGS. 6A-6D show additional steps of a method for welding the first liner 93 of the first strip member 91 to the second liner 94 at the second strip member 92 for forming a substantially continuous liner extending over the butt-spliced ends LE, TE along the upper side of the butt-spliced strip 9.

As shown in FIG. 6A, the clamp members 31, 32 of the second clamp 3 are moved apart, thereby releasing the butt-spliced strip 9 at the second clamp 3. The clamp members 21, 22 of the first clamp 2 are only slightly moved apart to release the clamping force in the first clamping direction C1. The first clamp 2 and the second clamp 3 are subsequently slid over the strip 9 in the discharge direction D to expose the butt-splice at the butt splice position A. At the same time, the liner clamp 4 is released from the first upper clamp member 21 to release the first liner 93 from the top of the first clamp 2. As the first clamp 2 moves in the discharge direction D, the first liner is held in position by the fourth clamp 53 while the first clamp 2 moves in the discharge direction D. As a result the first liner 93 is rolled off from the first clamp 2 and onto the second liner 94 positioned at the trailing end TE of the second strip member 92. The first liner 93 is thus rolled onto or applied to the second liner 94 at or near the butt-splice position A.

Figure 6B:
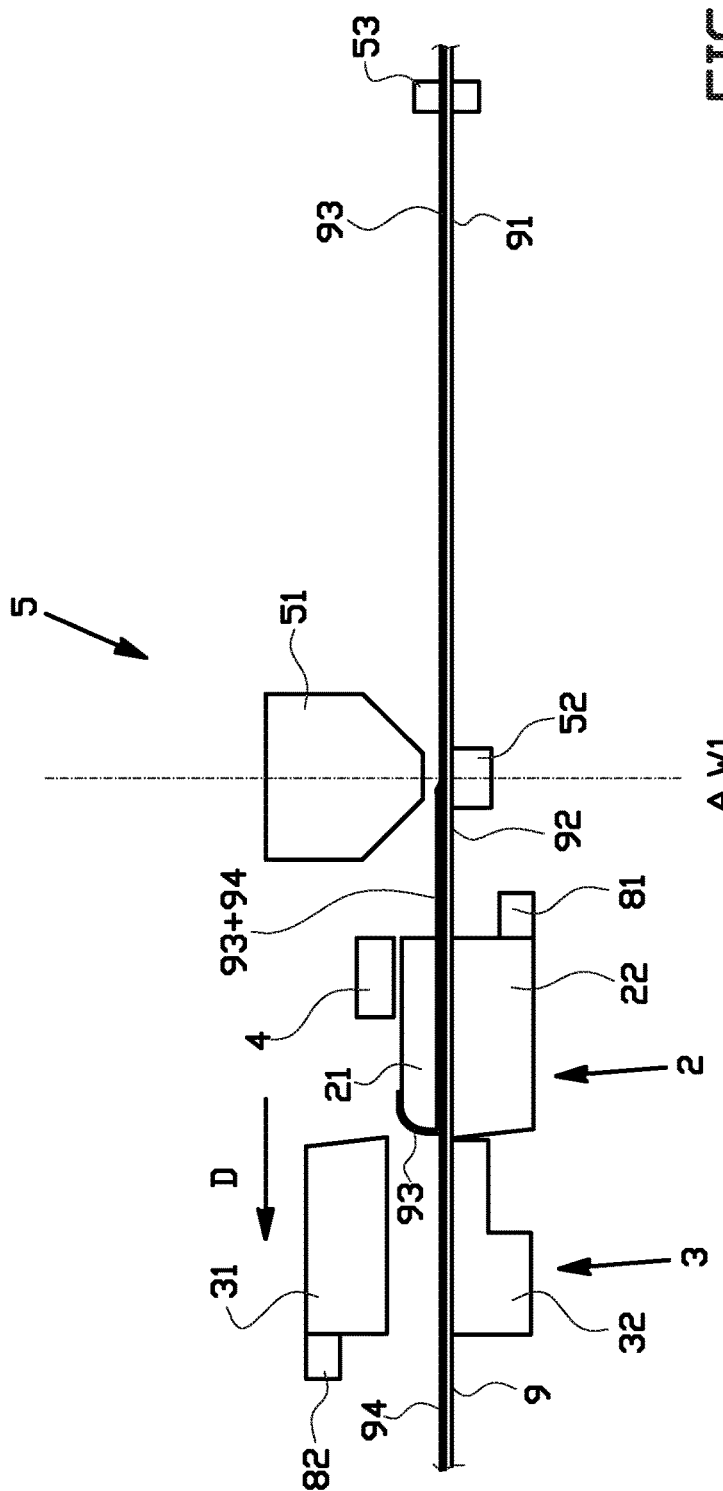

Next, as shown in FIG. 6B, the sealer 5 is moved into a first welding position W1 at or near the butt-splice position A, for welding the first liner 93 to the second liner 94 at the first welding position W1.

FIGS. 6C and 6D show how the first clamp 2 and the second clamp 3 are moved further downstream to further roll the first liner 93 onto the second liner 94. Meanwhile, the first strip member 91 and the first liner 93 are still fixated by the fourth clamp 53 in the transport direction T. The sealer 5 subsequently welds the first liner 93 on top of the second liner 94 at two more, spaced apart welding positions W2, W3 downstream of first weld position W1 and the butt-splice position A. Thus, a secure joint of the first liner 93 to second liner 94 at the butt-spliced leading end LE and trailing end TE can be provided.

If the alternative device 101 according to FIG. 5 was to be used in the method for welding the liners 93, 94, then it will be clear to the person skilled in the art that the steps of welding would be mirrored in the vertical plane as well. In particular, as shown in FIG. 5, the alternative device 101 comprises an alternative sealer 105 with the welding head 151 and counterpart 152 thereof arranged downstream of the second clamp 3. The fourth clamp 153 is arranged for fixating or clamping the second strip member 92 against movement in the transport direction during the handling and/or welding of the liners 93, 94. The second liner 94 is stripped, pulled or peeled off from the trailing end TE of the second strip 92 and subsequently pulled around or doubled back around the second upper clamp member 31. The third clamp 104 is arranged on top of the second upper clamp member 31 for clamping the second liner 94 on top of the second upper clamp member 31. Contrary to the configuration as shown in FIG. 1, it is now the first liner 93 that is cut-off together with the first strip member 91 during the preparation of the leading end LE and the trailing end TE. The welding steps as described above in relation to FIGS. 6A-D, are now performed for the second liner 94 that is subsequently released from the third clamp 104 and rolled onto the first liner 93 at the leading end LE of the first strip member 91 for subsequent welding by the sealer 105.

FIG. 7 shows a further alternative device 201 with a further alternative sealer 205, comprising a welding head 251 with three individual welding tools for welding at the three welding positions W1, W2, W3 simultaneously. Accordingly, the counterpart 252 is adapted to cooperate with the welding head 251 at the three welding positions W1, W2, W3 simultaneously. It will be clear to the person skilled in the art that with such an alternative sealer 205, the first liner 93 would be fully rolled onto the second liner 94 in accordance with FIG. 6D, prior to the welding. After the entire peeled off portion of the first liner 93 is released from the first clamp 2, the alternative sealer 205 welds the first liner 93 to the second liner 94 at the three welding positions W1, W2, W3 simultaneously.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary the invention relates to a device and method for butt-splicing strip members for tire components, comprising a first clamp and a second clamp arranged for clamping a first end of a first strip member and a second end of a second strip member, respectively, wherein at least one of the first clamp and the second clamp is movable along a butt-splice direction into a butt-splicing position opposite to the other of the first clamp and the second clamp for butt-splicing the ends, wherein the first clamp comprises a first upper clamp member and a first lower clamp member, wherein the second clamp comprises a second upper clamp member and a second lower clamp member, wherein the first lower clamp member projects beyond the first upper clamp member over a first overlap distance and wherein the second upper clamp member projects beyond the second lower clamp member over a second overlap distance.

The invention claimed is:

1. A device for butt-splicing strip members for tire components, comprising a first clamp and a second clamp arranged for clamping a first end of a first strip member and a second end of a second strip member, respectively, wherein at least one of the first clamp and the second clamp is movable along a butt-splice direction into a butt-splicing position in which the first clamp and the second clamp are arranged to be opposite to each other in said butt-splice direction for butt-splicing the first end of the first strip member and the second end of the second strip member in the butt-splice direction, wherein the first clamp comprises a first upper clamp member and a first lower clamp member for in cooperation clamping the first end, wherein the second clamp comprises a second upper clamp member and a second lower clamp member for in cooperation clamping the second end, wherein the first lower clamp member projects beyond the first upper clamp member in the butt-splice direction towards the second clamp over a first overlap distance and wherein the second upper clamp member projects beyond the second lower clamp member in the butt-splice direction towards the first clamp over a second overlap distance.

2. The device according to claim 1, wherein the first lower clamp member and the second upper clamp member, in the butt-splicing position, are in mutual overlap in the butt-splice direction.

3. The device according to claim 1, wherein the smallest of the first overlap distance and the second overlap distance is at least one millimeter.

4. The device according to claim 3, wherein the smallest of the first overlap distance and the second overlap distance is at least three millimeters.

5. The device according to claim 1, wherein the first lower clamp member is arranged for fully supporting the first end of the first strip member.

6. The device according to claim 1, wherein the first lower clamp member is provided with a lower cutting edge, wherein the device further comprises a first knife that is arranged for cutting the first end of the first strip member along and in cooperation with the lower cutting edge.

7. The device according to claim 6, wherein the first knife is an upper knife that is movable in a first cutting direction transverse or perpendicular to the butt-splice direction along the lower cutting edge.

8. The device according to claim 6, wherein the lower cutting edge projects beyond the first upper clamp member in the butt-splice direction towards the second clamp over the first overlap distance.

9. The device according to claim 8, wherein the entire lower cutting edge projects beyond the first upper clamp member in the butt-splice direction towards the second clamp over the first overlap distance.

10. The device according to claim 6, wherein the first knife is arranged to be retracted into a first waiting position in which the first knife out of the way of the first clamp when moving in the butt-splice direction.

11. The device according to claim 1, wherein the second upper clamp member is provided with an upper cutting edge, wherein the device further comprises a second knife that is arranged for cutting the second end of the second strip member along and in cooperation with the upper cutting edge.

12. The device according to claim 11, wherein the second knife is a lower knife that is movable in a second cutting direction transverse or perpendicular to the butt-splice direction along the upper cutting edge.

13. The device according to claim 11, wherein the upper cutting edge projects beyond the second lower clamp member in the butt-splice direction towards the first clamp over the second overlap distance.

14. The device according to claim 13, wherein the entire upper cutting edge projects beyond the second lower clamp member in the butt-splice direction towards the first clamp over the second overlap distance.

15. The device according to claim 1, wherein the device is provided with a first drive for driving the first clamp towards the second clamp.

16. The device according to claim 1, wherein the device is provided with a second drive for driving the second clamp towards the first clamp.

17. The device according to claim 1, wherein the first end is the leading end of the first strip member and the second end is the trailing end of the second strip member.

18. The device according to claim 17, wherein the first strip member and the second strip member are arranged to be transported in a transport direction, wherein the first clamp is located upstream of the second clamp in the transport direction.

19. The device according to claim 17, wherein the first strip member and the second strip member are provided with a first liner and a second liner, respectively, wherein the first liner is arranged to be peeled off from the first end prior to butt-splicing and to be applied on top the second liner at the second strip member after butt-splicing, wherein the device further comprises a sealer for welding the first liner to the second liner at the second strip member at or near the butt-spliced ends thereof after butt-splicing.

20. A method for butt-splicing strip members for tire components with the use of the device according to claim 1, wherein the method comprises the step of moving the first clamp and/or the second clamp into the butt-splicing position such that the first lower clamp member and the second upper clamp member, respectively, are in mutual overlap in the butt-splice direction.

21. The method according to claim 20, wherein the first strip member and the second strip member are provided with a first liner and a second liner, respectively, wherein the first end is the leading end of the first strip member and the second end is the trailing end of the second strip member, wherein the method further comprises the steps of peeling of the first liner from the first end prior to butt-splicing, applying the first liner on top of the second liner after butt-splicing and welding the first liner to the second liner at a first welding position at or near the butt-splicing position after butt-splicing.

* * * * *